Oct. 20, 1931.  F. J. OVEN  1,828,471
GASKET
Filed March 7, 1931

Inventor:
Frank J. Oven
By Wm. D. Bell, Atty.

Patented Oct. 20, 1931

1,828,471

UNITED STATES PATENT OFFICE

FRANK J. OVEN, OF CHICAGO, ILLINOIS, ASSIGNOR TO VICTOR MANUFACTURING & GASKET COMPANY, OF CHICAGO, ILLINOIS, A CORPORATION OF ILLINOIS

GASKET

Application filed March 7, 1931. Serial No. 520,859.

This invention relates to gaskets and more particularly to cylinder head gaskets.

It sometimes happens that the head of an internal combustion engine will shrink, warp or otherwise distort from excessive heat at some part thereof due to the design, shape or operation of the engine or for other reasons. This will cause the joint between the head and the block to yield and possibly to open sufficiently to permit leakage. This is likely to happen in an internal combustion engine because there is a higher temperature on the valve side of the engine than on the opposite side. The unequal heating may cause the head to shrink transversely to release or open the joint sufficiently to permit leakage.

My invention has for its object to provide a cylinder head gasket which will adjust itself automatically at the joint to compensate for any reasonable amount of shrinkage in the head due to the excess heating of the head at the valve side of the engine.

A further object of the invention is to provide a simple and novel reenforcement for a cylinder head gasket along that edge which is located where distortion is most likely to happen to automatically compensate for shrinkage in the head.

In the accompanying drawings illustrating a selected embodiment of the invention Fig. 1 is a plan view of a cylinder head gasket for an overhead valve engine;

Figure 1:
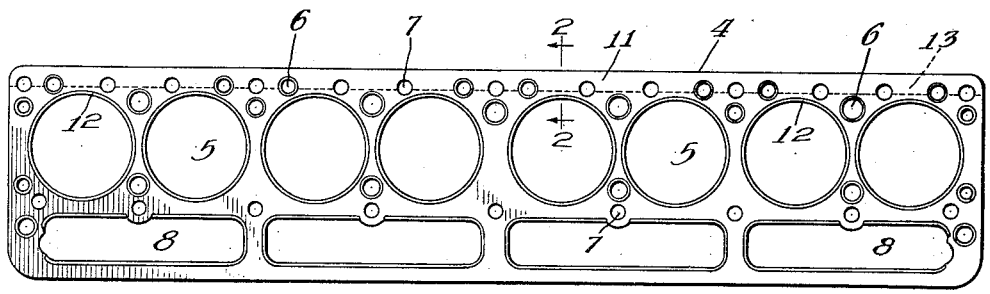
Figure 2:
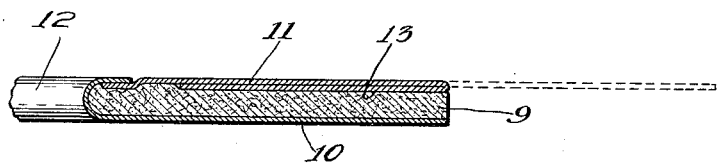
Fig. 2 is a sectional view on the line 2—2 of Fig. 1.
Figure 3:
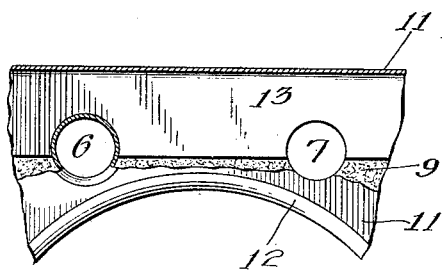
Fig. 3 is a fragmentary sectional view.

Referring to the drawings, the gasket 4 has cylinder openings 5, water circulation openings 6, bolt openings 7 and tappet rod openings 8. The gasket herein selected to illustrate the invention comprises a layer 9 of gasket material such as asbestos or other suitable compressible material, a bottom metal layer 10 and a top metal layer 11 of copper or other suitable metal. The bottom layer has flanges 12 which project up through the openings 5, 6 and 8 and overlap the edges of the top layer about said openings. Any other materials and any other construction of gasket suitable for the purpose or to which the invention may be adapted may be employed. The top metal layer 11 is provided with an integral hem 13 which extends preferably from end to end of the gasket, and is lapped beneath the top metal layer and embedded in the layer 9. This hem may vary in width but I have found it satisfactory to have it extend partly across that part of the gasket illustrated which contains the openings 6 and 7, it being sufficient to provide a hem of substantial width along that edge of the gasket which is located at the valve side of the engine, and which may vary in width as desired. It will also be understood that the openings in the gasket vary in position for different engines and some may be located partly in the hem as shown or some may be located wholly within the hem or the hem may be entirely clear of openings. The hem is an integral part of the top metal layer 11 and is bent inwardly upon this layer on the underside thereof in snug contact therewith and is embedded in the asbestos layer 9 when the parts of the gasket are assembled. When the gasket is secured in place between the block and the head of the engine to seal the joint, that part of the asbestos layer 9 under the hem will be compressed to a greater extent than other parts of the asbestos layer except where the flanges 12 overlap the single thickness of the top metal layer. Since this hem is to extend along the marginal edge of that part of the gasket which is most likely to be distorted, any release of pressure afforded by the securing bolts upon the gasket at the valve side of the engine due to shrinking, warping or other distortion of the head from excessive heating will be compensated for by expansion of the asbestos layer 9 beneath the hem. This distortion most often occurs at the valve side of the engine and for this reason the hem is usually provided along the side of gasket to be disposed at the valve side of the engine. The gasket may be used as a replacement in engines where the head has shrunk or warped or distorted from excessive heating at the valve side of the engine because it will compress more readily where there is an absence of double thickness of metal on the top side of the asbestos layer and thereby the head may be tightly clamped upon the gasket to form a tight seal notwithstanding irregularities in the face of the head lying upon the gasket.

I have shown the invention in one form of gasket for which it is adapted but I do not restrict the invention thereto nor to the particular size, construction or materials of the gasket, but reserve the right to make any changes therein within the scope of the following claims.

I claim:

1. A gasket comprising a layer of compressible gasket material having a metal layer thereon, said metal layer being folded upon itself to form an integral hem lying snugly on one side thereof and extending along one edge of the gasket.

2. A gasket comprising a layer of compressible gasket material, a bottom metal layer and a top metal layer, one of said metal layers having an integral hem bent inwardly to lie snugly against the inner side thereof and against the compressible layer and extending along one edge of the gasket.

3. A gasket comprising a layer of compressible gasket material, a bottom metal layer and a top metal layer, one of said metal layers having an integral hem bent inwardly to lie snugly against the inner side thereof and against the compressible layer and extending along one edge of the gasket which will be located at the valve side of the engine in which the gasket is installed.

4. A gasket comprising a layer of compressible gasket material, a bottom metal layer and a top metal layer, said top metal layer having an integral hem bent inwardly under said top metal layer to lie snugly against the underside thereof and upon the compressible layer and extending along that edge of the gasket which will be located at the valve side of the engine in which the gasket is installed.

FRANK J. OVEN.